(12) United States Patent
Kageura et al.

(10) Patent No.: US 10,377,640 B2
(45) Date of Patent: Aug. 13, 2019

(54) ELECTRODE MIXTURE, ELECTRODE, AND NONAQUEOUS ELECTROLYTE SECONDARY CELL

(75) Inventors: Jun-ichi Kageura, Tsukuba (JP); Takitaro Yamaguchi, Ryugasaki (JP)

(73) Assignee: SUMITOMO CHEMICAL COMPANY, LIMITED, Chuo-ku, Tokyo (JP)

( * ) Notice: Subject to any disclaimer, the term of this patent is extended or adjusted under 35 U.S.C. 154(b) by 1065 days.

(21) Appl. No.: 13/140,927

(22) PCT Filed: Dec. 21, 2009

(86) PCT No.: PCT/JP2009/071827
§ 371 (c)(1),
(2), (4) Date: Jun. 20, 2011

(87) PCT Pub. No.: WO2010/074293
PCT Pub. Date: Jul. 1, 2010

(65) Prior Publication Data
US 2011/0256442 A1    Oct. 20, 2011

(30) Foreign Application Priority Data
Dec. 22, 2008    (JP) .................................. 2008-325294

(51) Int. Cl.
| | | |
|---|---|---|
| *H01M 4/131* | (2010.01) | |
| *C01G 45/12* | (2006.01) | |
| *H01M 4/04* | (2006.01) | |
| *H01M 4/485* | (2010.01) | |
| *H01M 4/505* | (2010.01) | |
| *H01M 4/525* | (2010.01) | |
| *H01M 4/62* | (2006.01) | |
| *C01G 51/00* | (2006.01) | |
| *C01G 53/00* | (2006.01) | |

(52) U.S. Cl.
CPC ......... *C01G 45/1228* (2013.01); *C01G 51/50* (2013.01); *C01G 53/50* (2013.01); *H01M 4/0404* (2013.01); *H01M 4/131* (2013.01); *H01M 4/485* (2013.01); *H01M 4/505* (2013.01); *H01M 4/525* (2013.01); *H01M 4/621* (2013.01); *C01P 2002/54* (2013.01); *C01P 2002/76* (2013.01); *C01P 2004/62* (2013.01); *C01P 2006/12* (2013.01); *C01P 2006/40* (2013.01)

(58) Field of Classification Search
CPC ...... H01M 4/485; H01M 4/131; H01M 4/505; H01M 4/525; H01M 4/621; H01M 4/0404; C01G 45/1228; C01G 53/50; C01G 51/50; C01P 2006/12; C01P 2004/62; C01P 2002/76; C01P 2002/54; C01P 2006/40
USPC ............. 429/144, 221, 223, 224, 231.3, 217
See application file for complete search history.

(56) References Cited

U.S. PATENT DOCUMENTS

| | | | |
|---|---|---|---|
| 6,019,802 A | 2/2000 | Ishizuka et al. | |
| 6,709,788 B2 | 3/2004 | Hosokawa et al. | |
| 7,833,656 B2* | 11/2010 | Nishimura et al. | ........... 429/152 |
| 2005/0158546 A1* | 7/2005 | Shizuka | .............. H01M 4/0404 |
| | | | 428/402 |
| 2006/0228627 A1* | 10/2006 | Nakayama et al. | .......... 429/217 |
| 2007/0099087 A1* | 5/2007 | Mihara | ................... C01B 25/45 |
| | | | 429/231.95 |
| 2008/0160412 A1* | 7/2008 | Kasamatsu et al. | .......... 429/223 |
| 2008/0248396 A1* | 10/2008 | Jung | ....................... H01M 4/13 |
| | | | 429/306 |
| 2008/0299457 A1* | 12/2008 | Muraoka et al. | ............. 429/217 |
| 2009/0239147 A1* | 9/2009 | Itou | ........................ C08L 27/16 |
| | | | 429/217 |
| 2010/0015514 A1* | 1/2010 | Miyagi | ............... H01M 2/0287 |
| | | | 429/129 |

FOREIGN PATENT DOCUMENTS

| | | | | |
|---|---|---|---|---|
| JP | 02-158055 A | 6/1990 | | |
| JP | 2001-266949 A | 9/2001 | | |
| JP | 2002-050360 A | 2/2002 | | |
| JP | 2006-278341 A | 10/2006 | | |
| JP | 2006-302553 A | 11/2006 | | |
| JP | 2006302553 A | * 11/2006 | | |
| JP | WO 2007055087 A1 | * 5/2007 | .......... H01M 10/052 | |
| JP | 2007-165027 A | 6/2007 | | |
| JP | 2007-165072 A | 6/2007 | | |
| JP | 2007165027 A | * 6/2007 | | |
| JP | 2008-027600 A | 2/2008 | | |
| WO | WO 2006098216 A1 | * 9/2006 | | |

OTHER PUBLICATIONS

English Translation of JP 2006302553 A.*

(Continued)

*Primary Examiner* — Milton I Cano
*Assistant Examiner* — Philip A. Stuckey
(74) *Attorney, Agent, or Firm* — Sughrue Mion, PLLC

(57) ABSTRACT

The present invention provides an electrode mixture, an electrode and a nonaqueous electrolyte secondary battery. The electrode mixture includes a lithium mixed metal oxide represented by formula (1):

$$Li_z(Ni_{1-x-y}Mn_xM_y)O_2 \qquad (1),$$

an electrically conductive material, and a water-dispersible polymeric binder, wherein x is 0.30 or more and less than 1, y is 0 or more and less than 1, x+y is 0.30 or more and less than 1, z is 0.5 or more and 1.5 or less, and M represents one or more members selected from the group consisting of Co, Al, Ti, Mg and Fe.

6 Claims, No Drawings

(56) References Cited

OTHER PUBLICATIONS

English Translation of JP 2007165027 A.*
Cho, T. H., et al. "Effect of synthesis condition on the structural and electrochemical properties of Li [Ni1/3Mn1/3Co1/3] O2 prepared by carbonate co-precipitation method." Journal of power sources 142.1-2 (2005): 306-312. (Year: 2005).*
International Search Report dated Dec. 22, 2008, issued in PCT/JP2009/071827.
Office Action dated Sep. 24, 2013 in corresponding Japanese Patent Application No. 2009-282666 with English translation.
Office Action dated Mar. 29, 2013 in corresponding Chinese Patent Application No. 200980151369.X with English translation.

* cited by examiner

ELECTRODE MIXTURE, ELECTRODE, AND NONAQUEOUS ELECTROLYTE SECONDARY CELL

CROSS REFERENCE TO RELATED APPLICATIONS

This application is a National Stage of International Application No. PCT/JP2009/071827, filed Dec. 21, 2009, claiming priority based on Japanese Patent Application No. 2008-325294, filed Dec. 22, 2008, the contents of all of which are incorporated herein by reference in their entirety.

TECHNICAL FIELD

The present invention relates to an electrode mixture, an electrode and a nonaqueous electrolyte secondary battery.

BACKGROUND ART

An electrode mixture is used for an electrode in a non-aqueous electrolyte secondary battery. As the nonaqueous electrolyte secondary battery, a lithium secondary battery is typical, and the lithium secondary battery has been previously put into practical use as an electric source of cell phones, laptop computers and the like, and further, there are trials of application thereof also in medium or large size applications such as an automobile application and an electric power storage application.

A lithium secondary battery usually comprises a positive electrode containing a positive electrode active material which can be doped or dedoped with a lithium ion and a negative electrode containing a negative electrode active material which can be doped or dedoped with a lithium ion, and an electrolyte.

An example of the electrode mixture includes a substance obtained by mixing and kneading an electrode active material such as a positive electrode active material and a negative electrode active material, a binder and a dispersion medium. As the binder and the dispersion medium, organic solvent based binders are typical, and examples of the organic solvent based binders include polyvinylidene fluoride (binder) and N-methyl-2-pyrrolidone (dispersion medium). On the other hand, it is known that water based binders are used as a binder and a dispersion medium in order to reduce high electrode production costs due to use of an organic solvent, and specifically an aqueous dispersion of polytetrafluoroethylene (JP2-158055A), water-soluble polymers such as cellulose and the like and water (JP2002-42817A) are known.

DISCLOSURE OF THE INVENTION

As is apparent from the description in JP2002-42817A, when such a LiNiO$_2$ positive electrode active material having a small particle size that its specific surface area is more than 0.65 m$^2$/g is used as an active material, it is possible to enhance a battery capacity of the lithium secondary battery, but use of the above-mentioned water based binder such as an aqueous dispersion causes problems of decrease in a battery capacity and deterioration of a large current discharge property, and this is thought to result from high reactivity of the LiNiO$_2$ positive electrode active material with water (paragraph 0009). It is an object of the present invention to provide an aqueous electrode mixture and an electrode, which lead to a nonaqueous electrolyte secondary battery having a sufficient battery capacity, particularly a sufficient initial discharge capacity.

In view of the above state of the art, the present inventors made various investigations, consequently leading to completion of the present invention.

The present invention provides the following.

<1> An electrode mixture including a lithium mixed metal oxide represented by formula (1):

$$Li_z(Ni_{1-x-y}Mn_xM_y)O_2 \qquad (1)$$

wherein, x is 0.30 or more and less than 1,
y is 0 or more and less than 1,
x+y is 0.30 or more and less than 1,
z is 0.5 or more and 1.5 or less, and
M represents one or more members selected from the group consisting of Co, Al, Ti, Mg and Fe,
an electrically conductive material, and a water-dispersible polymeric binder.

<2> The electrode mixture according to <1>, wherein the water-dispersible polymeric binder contains an aqueous emulsion and/or an aqueous dispersion.

<3> The electrode mixture according to <2>, wherein the water-dispersible polymeric binder contains one or more aqueous emulsions selected from the group consisting of vinyl polymer emulsions and acrylic polymer emulsions.

<4> The electrode mixture according to <2>, wherein the water-dispersible polymeric binder is an aqueous polytetrafluoroethylene dispersion.

<5> The electrode mixture according to any one of <1> to <4>, wherein the water-dispersible polymeric binder further contains a thickener.

<6> The electrode mixture according to <5>, wherein the thickener contains one or more members selected from the group consisting of methylcellulose, carboxymethylcellulose, polyethylene glycol, sodium polyacrylate, polyvinyl alcohol and polyvinylpyrrolidone.

<7> The electrode mixture according to any one of <1> to <6>, wherein the lithium mixed metal oxide is made from a powder having a BET specific surface area of 2 m$^2$/g or more and 30 m$^2$/g or less.

<8> The electrode mixture according to any one of <1> to <7>, wherein the electrically conductive material contains a carbonaceous material.

<9> An electrode obtained by applying the electrode mixture according to any one of <1> to <8> onto a current collector and drying the electrode mixture.

<10> A nonaqueous electrolyte secondary battery including the electrode according to <9> as a positive electrode.

<11> The nonaqueous electrolyte secondary battery according to <10> further including a separator.

<12> The nonaqueous electrolyte secondary battery according to <11>, wherein the separator is a separator including a laminated film which has a heat resistant porous layer and a porous film laminated to each other.

MODE FOR CARRYING OUT THE INVENTION

Electrode Mixture

The electrode mixture of the present invention includes a lithium mixed metal oxide, an electrically conductive material, and a water-dispersible polymeric binder.

Lithium Mixed Metal Oxide

The lithium mixed metal oxide is represented by formula (1):

$$Li_z(Ni_{1-x-y}Mn_xM_y)O_2 \qquad (1)$$

wherein x is 0.30 or more and less than 1, y is 0 or more and less than 1, x+y is 0.30 or more and less than 1, z is 0.5 or more and 1.5 or less, and M represents one or more members selected from the group consisting of Co, Al, Ti, Mg and Fe.

The lithium mixed metal oxide acts as a positive electrode active material in the nonaqueous electrolyte secondary battery. In the formula (1), M is preferably Co and/or Fe from the viewpoint of enhancing battery capacity, and more preferably Fe from the viewpoint of further enhancing a large current discharge property. Preferable x is 0.30 or more and 0.9 or less, and more preferable x is 0.30 or more and 0.6 or less. Preferable y is 0.001 or more and 0.5 or less, and more preferable y is 0.01 or more and 0.3 or less. Further, x+y is 0.4 or more and 0.9 or less, and more preferable x+y is 0.4 or more and 0.8 or less. Preferable z is 0.95 or more and 1.5 or less, and more preferable z is 1.0 or more and 1.4 or less. By defining such the ranges for x, y, and z, the battery capacity can be further enhanced.

Further, the lithium mixed metal oxide is preferably made of a powder having a BET specific surface area of 2 $m^2/g$ or more and 30 $m^2/g$ or less. Even though the powder having a large BET specific surface area like this, that is, the powder made of particles having a small particle size is used, the effect of the present invention can be achieved and further the large current discharge property of the resulting secondary battery can be improved.

The lithium mixed metal oxide is usually made of primary particles having an average particle size of 0.05 µm or more and 1 µm or less, preferably 0.1 µm or more and 1.0 µm or less, and the lithium mixed metal oxide comprises a mixture of primary particles and secondary particles having an average particle size of 0.1 µm or more and 100 µm or less formed by aggregation of primary particles. The average particle size of primary particles (average primary particle size) and the average particle size of secondary particles (average secondary particle size) can be measured by observing by SEM.

The lithium mixed metal oxide preferably has a crystalline structure of α-NaFeO$_2$-type, that is, a crystalline structure belonging to the R-3m space group for further enhancing the capacity of the nonaqueous electrolyte secondary battery using the lithium mixed metal oxide. The crystalline structure can be identified from a powder X-ray diffraction pattern obtained by powder X-ray diffractometry using CuKα as a radiation source, for the lithium mixed metal oxide.

The lithium mixed metal oxide can be obtained by calcining, for example, a raw material containing constituent metal elements in a prescribed ratio. The BET specific surface area of the lithium mixed metal oxide depends on kinds of the constituent metal elements, and can be controlled by a calcining temperature. The raw material can be a mixture of compounds of the constituent metal elements, or can be a mixed compound which contains a plurality of metal elements as a compound. As the compounds of metal elements, oxides of metal elements are used, or compounds, which are capable of decomposing and/or oxidizing at elevated temperatures to become an oxide, such as hydroxides, oxyhydroxides, carbonates, nitrates, acetates, halides, oxalates and alkoxides, can be used. The raw material can be produced by appropriately using techniques such as a coprecipitation method, a mixing method, a sol-gel method, a spray drying method, an electrostatic atomizing method and a hydrothermal method.

A method of obtaining the lithium mixed metal oxide by use of a coprecipitation method will be described. The lithium mixed metal oxide can be obtained by a method of producing a lithium mixed metal oxide, comprising the following steps (1), (2) and (3) in that order. This production method is preferred, since a lithium mixed metal oxide having a large BET specific surface area and a small average particle size can be simply obtained.

(1) a step of bringing an aqueous solution containing Ni, Mn, and M into contact with an alkali to obtain a coprecipitate slurry, (2) a step of obtaining a coprecipitate from the coprecipitate slurry, (3) a step of calcining a mixture obtained by mixing the coprecipitate and a lithium compound to obtain a lithium mixed metal oxide.

In the step (1), as the aqueous solution containing Ni, Mn, and M, an aqueous solution obtained by dissolving the respective raw materials containing Ni, Mn and M, into water can be used. The respective chlorides, nitrates, sulphates, and the like of Ni, Mn, and M can be used as the respective raw materials, and it is preferable that all of the raw materials to be used be chlorides. Further, when Fe which is preferred as M is used, chloride of divalent Fe is preferably used. In the case where the respective raw materials containing Ni, Mn or Fe are hardly soluble in water, for example, when these raw materials are oxides, hydroxides or metal materials, these raw materials can be dissolved in an aqueous solution containing hydrochloric acid, nitric acid or sulfuric acid to obtain an aqueous solution containing Ni, Mn, and M.

In the step (1), examples of the alkali include anhydrides of one or more compounds selected from the group consisting of LiOH (lithium hydroxide), NaOH (sodium hydroxide), KOH (potassium hydroxide), Li$_2$CO$_3$ (lithium carbonate), Na$_2$CO$_3$ (sodium carbonate), K$_2$CO$_3$ (potassium carbonate) and (NH$_4$)$_2$CO$_3$ (ammonium carbonate), and/or hydrates of the one or more compounds. In the step (1), an aqueous solution of the alkali is preferably used. The alkali aqueous solution includes ammonia water. The concentration of an alkali in the alkali aqueous solution is usually about from 0.5 to 10 M, preferably about from 1 to 8 M. It is preferable from the viewpoint of production cost to use an anhydride and/or a hydrate of NaOH or KOH, as the alkali to be used. Two or more alkalis may be used in combination.

The contact method in the step (1) includes a method in which an alkali aqueous solution is added to an aqueous solution containing Ni, Mn, and M and these are mixed, a method in which an aqueous solution containing Ni, Mn, and M is added to an alkali aqueous solution and these are mixed, and a method in which an aqueous solution containing Ni, Mn, and M and an alkali aqueous solution are added to water and these are mixed. It is preferable that these mixing procedures be accompanied by stirring. Among these contact methods, the method in which an aqueous solution containing Ni, Mn, and M is added to an alkali aqueous solution and these are mixed can be preferably used since a pH is controlled easily in this method.

In the step (1), a coprecipitate is generated and a coprecipitate slurry can be obtained.

The ratio of the amount (mol) of Mn to the total amount (mol) of Ni, Mn and M is 0.30 or more and less than 1, preferably 0.30 or more and 0.9 or less, and more preferably 0.30 or more and 0.6 or less in the aqueous solution containing Ni, Mn, and M in the step (1).

The ratio of the amount (mol) of M to the total amount (mol) of Ni, Mn and M is 0 or more and less than 1, preferably 0.001 or more and 0.5 or less, and more preferably 0.01 or more and 0.3 or less in the aqueous solution containing Ni, Mn, and M.

In the step (2), a coprecipitate is obtained from the coprecipitate slurry. The step (2) may be carried out by any methods as long as a coprecipitate can be obtained, but from the viewpoint of operability, methods according to solid-liquid separation such as filtration are preferably used. A coprecipitate can also be obtained by methods of volatilizing liquid with heating such as spray drying, using a coprecipitate slurry.

In the case of obtaining a coprecipitate by solid-liquid separation in the step (2), the step (2) is preferably the following step (2'):

(2') A step of subjecting the coprecipitate slurry to solid-liquid separation, and then subjecting to washing and drying, to obtain a coprecipitate.

In the case of the presence of alkali and Cl in excess quantity in a solid obtained after solid-liquid separation in the step (2'), these can be removed by washing with a washing liquid. For washing the solid efficiently, it is preferable to use water as the washing liquid. If necessary, water-soluble organic solvents such as alcohols and acetones may be added to the washing liquid. Washing may be carried out twice or more, and for example, it is also possible that washing is carried out with water, and then washing is again carried out with the water-soluble organic solvent as described above.

In the step (2'), after washing, drying is performed to obtain a coprecipitate. Although drying is usually carried out by a thermal treatment, it may also be carried out by air blast drying, vacuum drying and the like. In the case of the thermal treatment, it is carried out usually at from 50° C. to 300° C., preferably at about from 100° C. to 200° C.

The BET specific surface area of a coprecipitate obtained in the step (2') is usually about 10 m$^2$/g or more and 100 m$^2$/g or less. The BET specific surface area of a coprecipitate can be adjusted by a drying temperature. The BET specific surface area of a coprecipitate is preferably 20 m$^2$/g or more and more preferably 30 m$^2$/g or more for promoting the reactivity in the calcination described later. Further, from the viewpoint of operability, the BET specific surface area of a coprecipitate is preferably 90 m$^2$/g or less and more preferably 85 m$^2$/g or less. The coprecipitate is usually made of a mixture of primary particles having a particle size of 0.001 μm or more and 0.1 μm or less and secondary particles having a particle size of 1 μm or more and 100 μm or less formed by aggregation of the primary particles. The particle sizes of primary particles and secondary particles can be measured by observing by a scanning electron microscope (hereinafter, referred to as SEM in some cases). The particle size of secondary particles is preferably 1 μm or more and 50 μm or less, and more preferably 1 μm or more and 30 μm or less.

In the step (3), a mixture obtained by mixing the coprecipitate and a lithium compound so as to be of the prescribed proportion is calcined to obtain a lithium mixed metal oxide. Examples of the lithium compound include anhydrides of one or more compounds selected from the group consisting of lithium hydroxide, lithium chloride, lithium nitrate and lithium carbonate, and/or hydrates of the one or more compounds. Mixing may be carried out by either dry mode mixing or wet mode mixing, and from the viewpoint of simplicity, dry mode mixing is preferable. Examples of a mixing apparatus include a stirring mixer, a V-shaped mixer, a W-shaped mixer, a ribbon mixer, a drum mixer, a ball mill and the like.

In the step (3), a calcining temperature is preferably about 600° C. or more and 900° C. or less, more preferably about 650° C. or more and 850° C. or less. By calcining at such a calcining temperature, a large current discharge property of the resulting secondary battery can be further enhanced.

Further, by varying the calcining temperature, the average particle size and the BET specific surface area of the lithium mixed metal oxide can be adjusted. Generally, when the calcining temperature is higher, the average particle size tends to be larger and the BET specific surface area tends to be smaller. The time of keeping the calcining temperature is usually from 0.1 to 20 hours and preferably from 0.5 to 12 hours. The temperature rising rate up to the calcining temperature is usually from 50° C. to 400° C./hour, and the temperature dropping rate down to room temperature from the retention temperature is usually from 10° C. to 400° C./hour. As the calcination atmosphere, air, oxygen, nitrogen, argon or a mixed gas thereof can be used, but an air atmosphere is preferable.

In the calcination, the mixture may contain a reaction accelerator such as ammonium fluoride or boric acid. More specific examples of the reaction accelerator include chlorides such as NaCl, KCl and NH$_4$Cl; fluorides such as LiF, NaF, KF and HN$_4$F; and boric acid, and preferably the chlorides, and more preferably KCl. By including a reaction accelerator in the mixture, the reactivity of the mixture in the calcination can be improved, and the lithium mixed metal oxide having a small average particle size and a large BET specific surface area can be controlled in some cases. Usually, when the calcining temperature is the same, if the content of a reaction accelerator in the mixture is larger, the average particle size tends to be larger and the BET specific surface area tends to be smaller. Further, two or more reaction accelerators can be used in combination. The reaction accelerator may be added and mixed in mixing of a coprecipitate and a lithium compound. The reaction accelerator may remain in a lithium mixed metal oxide, or may be removed by washing, evaporation and the like.

After the calcination, the lithium mixed metal oxide may be pulverized using a ball mill, jet mill or the like. A lithium mixed metal oxide having a large BET specific surface area can also be obtained by pulverization. Pulverization and calcination may be repeated twice or more. The lithium mixed metal oxide can also be washed or classified as required.

Electrically Conductive Material

Examples of the electrically conductive material include carbonaceous materials, and more specific examples thereof include a graphite powder, carbon black (e.g., acetylene black, etc.), filamentous carbonaceous materials (carbon nanotube, carbon nanofiber, carbon fibers by vapor-phase growth, etc.) and the like.

Carbon black (e.g., acetylene black, etc.) can be added in a small amount to an electrode mixture to enhance the electric conductivity in the resulting electrode and to improve charge and discharge efficiency and large current discharge property since carbon black is made of fine particles and has a large surface area. Usually, the proportion of an electrically conductive material in an electrode mixture is 5 parts by weight or more and 20 parts by weight or less with respect to 100 parts by weight of the lithium mixed metal oxide. In the case of using a fine-particle carbonaceous material or a filamentous carbonaceous material as described above as the electrically conductive material, it is also possible to decrease this proportion.

Water-Dispersible Polymeric Binder

The water-dispersible polymeric binder contains a binder resin and water as a dispersion medium. The binder resin comprises a polymer and is dispersed in water. A part (e.g., less than 50% by weight of water) of the water may be replaced with a water-soluble organic solvent, but it is preferred to use only water as a dispersion medium.

A preferable form of the water-dispersible polymeric binder contains an aqueous emulsion and/or an aqueous dispersion.

Examples of the aqueous emulsion include one or more aqueous emulsions selected from the group consisting of vinyl polymer emulsions and acrylic polymer emulsions. Examples of the vinyl polymers include vinyl acetate polymers (vinyl acetate monopolymer, vinyl acetate copolymer), and vinyl chloride polymers (vinyl chloride monopolymer, vinyl chloride copolymer), and examples of the acrylic polymers include alkyl acrylate monopolymers (methyl acrylate polymer, ethyl acrylate polymer, etc.), and alkyl acrylate copolymers, and among these polymers, copolymers are preferable from the viewpoint of controllability a glass transition temperature. Specific examples of preferable copolymers include ethylene-vinyl acetate copolymer, ethylene-vinyl acetate-vinyl chloride copolymer, vinyl acetate-alkyl acrylate copolymer (vinyl acetate-methyl acrylate copolymer, vinyl acetate-ethyl acrylate copolymer, etc.), ethylene-vinyl chloride copolymer, vinyl chloride-vinyl acetate copolymer, vinyl chloride-alkyl acrylate copolymer (vinyl chloride-methyl acrylate copolymer, vinyl chloride-ethyl acrylate copolymer, etc.), ethylene-vinyl acetate-alkyl acrylate copolymer (ethylene-vinyl acetate-methyl acrylate copolymer, ethylene-vinyl acetate-ethyl acrylate copolymer, etc.), and methyl acrylate-ethyl acrylate copolymer, and these polymers may be used as a mixture of two or more thereof.

In the electrode mixture, when these aqueous emulsions are used as a water-dispersible polymeric binder, it is possible to provide an electrode which has a high binding force to a current collector described later and excellent peeling strength, and in the nonaqueous electrolyte secondary battery, it is possible to provide an excellent battery characteristic for a long time. A used amount of the aqueous emulsion may be small, and this is effective for improving a volumetric energy density of the nonaqueous electrolyte secondary battery, that is, for improving a capacity.

As the aqueous emulsion, a publicly known aqueous emulsion may be used, and the aqueous emulsion is produced by emulsion polymerization such as a surfactant method using a surfactant such as soap and a colloid method using a water-soluble polymer such as polyvinyl alcohol as a protective colloid, and a batch polymerization method, a pre-emulsion dropping method, or a monomer dropping method may be employed. Further, average particle sizes of various polymers in the aqueous emulsion can be varied by controlling a monomer concentration, a reaction temperature, or a stirring speed. By the emulsion polymerization, a particle size distribution of a polymer can be sharp, and by using such an aqueous emulsion, components in the electrode can be homogeneous.

As the aqueous dispersion, publicly known one may be used, and an aqueous polytetrafluoroethylene dispersion is preferable, and this can be obtained, for example, by dispersing polytetrafluoroethylene in water.

A polymer dispersed in the water-dispersible polymeric binder (an aqueous emulsion or an aqueous dispersion) plays a role in binding the lithium mixed metal oxide and the electrically conductive material together and in binding the bound one and a current collector described later together, and the polymer is preferably further uniformly dispersed in the electrode mixture for playing the role. It is preferable that the average particle size of the polymer be set so as to be 1 to 300% with respect to the average particle size of the lithium mixed metal oxide so that the polymer is further uniformly dispersed in the electrode mixture. For example, if the average particle size of the lithium mixed metal oxide is 0.1 to 0.3 µm (about 5 to 20 m$^2$/g in terms of preferable BET specific surface area), the average particle size of the polymer is preferably 0.001 to 0.9 µm. The average particle size of the lithium mixed metal oxide can be determined by observation by an electron microscope such as SEM.

The water-dispersible polymeric binder may further contain a thickener. By containing the thickener, the viscosity of the electrode mixture can be adjusted. It is effective for improving coating properties in applying an electrode mixture described later onto a current collector to form an electrode to contain the thickener. The thickener preferably comprises a water-soluble polymer. Specific examples of the water-soluble polymer include one or more members selected from the group consisting of methylcellulose, carboxymethylcellulose, polyethylene glycol, sodium polyacrylate, polyvinyl alcohol and polyvinylpyrrolidone.

As the thickener, a thickener, which plays not only a role in adjusting the viscosity, but also a role as a binder, is preferable. Examples of the thickener include carboxymethylcellulose, sodium polyacrylate, polyvinyl alcohol and polyvinylpyrrolidone.

The thickener is preferably a thickener which improves the dispersibility of an electrically conductive material in water. Examples of the thickener include carboxymethylcellulose, sodium polyacrylate, polyvinyl alcohol and polyvinylpyrrolidone. Generally, since the electrically conductive material such as carbonaceous materials is hydrophobic, it is hardly dispersed uniformly in water. When the thickener has an action of improving the dispersibility of an electrically conductive material in water, the electrically conductive material can be dispersed further uniformly also in the electrode mixture. In an electrode prepared by using the electrode mixture containing such the thickener, the lithium mixed metal oxide and the electrically conductive material are dispersed further uniformly, and an electrically conductive path is better, and in the resulting nonaqueous electrolyte secondary battery, battery performance such as a battery capacity and a large current discharge property is more excellent.

A binder resin contained in the water-dispersible polymeric binder is preferably a resin, a glass transition temperature of which is 10° C. or less. In order to control a glass transition temperature of the polymer, an amount of a component such as an ethylene component, a butadiene component or a methyl acrylate component in the polymer may be controlled. By limiting the glass transition temperature to 10° C. or less, flexibility of the resulting electrode is improved, and a nonaqueous electrolyte secondary battery, which is sufficiently usable in a low temperature environment, can be attained.

In the battery mixture, an amount of the contained water-dispersible polymeric binder is preferably 0.1 to 15 parts by weight, and more preferably 0.5 to 6 parts by weight with respect to 100 parts by weight of the lithium mixed metal oxide from the viewpoint of improving a binding force of the electrode mixture to the current collector and suppressing increase in electrode resistance.

In the water-dispersible polymeric binder, a weight ratio between a water-dispersible polymer and the thickener is preferably from 1:99 to 9:1. By using this weight ratio, adhesive forces between electrode mixtures, and between the electrode mixture and the current collector can be further enhanced, coating properties to a current collector foil is further improved, and the electrode can be provided more stably.

The electrode mixture can be produced by kneading the lithium mixed metal oxide, the electrically conductive material, the water-dispersible polymeric binder, and water as required. It is preferred to mix the lithium mixed metal oxide and the electrically conductive material in advance as a procedure of kneading for the purpose of producing an electrode mixture in which the lithium mixed metal oxide and the electrically conductive material are dispersed homogeneously. Next, the water-dispersible polymeric binder, and water as requires are added and kneaded, and thereby an electrode mixture, in which the lithium mixed metal oxide and the electrically conductive material are dispersed homogeneously, can be produced.

As an apparatus to be used for kneading, an apparatus having a high shear force is preferable. Specific examples of the apparatus include a planetary mixer, a kneader, and an extrusion type kneading machine. Further, from the viewpoint of improving the dispersibility of the components in the electrode mixture, by using a dispersing machine typified by a homogenizer, aggregation of the components in the electrode mixture is mitigated, and a more homogeneous electrode mixture can be produced.

The concentrations of electrode components in the electrode mixture, that is, the concentrations of the lithium mixed metal oxide, the electrically conductive material and the polymer in the electrode mixture are usually 30 to 90% by weight, preferably 30 to 80% by weight, and more preferably 30 to 70% by weight from the viewpoint of the thickness of the resulting electrode and applicability.

Electrode

The electrode of the present invention is obtained by applying the electrode mixture onto the current collector and drying the electrode mixture. The water in the electrode mixture is removed by drying and the electrode mixture adheres to the current collector to form an electrode.

Examples of the current collector include Al, Ni, stainless steel and the like, and Al is preferable since it can be processed into a thin film easily and it is cheap. Examples of the shape and form of the current collector include foil, flat plate, mesh, net, lath, perforated metal or embossed metal, and combinations thereof (e.g., mesh-like flat plate). Projections and depressions may be formed on the surface of the current collector by etching.

Examples of the method of applying an electrode mixture onto a current collector include a slit die coating method, a screen coating method, a curtain coating method, a knife coating method, a gravure coating method and an electrostatic spray method. Although drying carried out after the application of the electrode mixture may be carried out by a thermal treatment, or may be carried out by air blast drying, vacuum drying and the like. In the case of drying by the thermal treatment, a drying temperature is usually about 50° C. to 150° C. Further, pressing may be carried out after drying. By the methods mentioned above, an electrode can be produced. The thickness of the electrode is usually about 5 to 500 μm.

The electrode is extremely useful as a positive electrode in the nonaqueous electrolyte secondary battery.

Nonaqueous Electrolyte Secondary Battery

The nonaqueous electrolyte secondary battery of the present invention has the above-mentioned electrode as a positive electrode, and usually, it further has a separator. A nonaqueous electrolyte secondary battery can be produced, for example, by the following method. That is, a separator, a negative electrode and a positive electrode are laminated and wound as required to obtain an electrode group, which is then accommodated in a battery case such as a battery can, and then is impregnated with an electrolytic solution made of an organic solvent containing an electrolyte, thus, a nonaqueous electrolyte secondary battery can be produced.

Examples of the shape of the electrode group include shapes revealing circle, ellipse, rectangle and rounded rectangle of cross section when the electrode group is cut in a direction perpendicular to the axis of winding thereof. Examples of the shape of the battery include a paper shape, a coin shape, a cylinder shape and a box shape.

Negative Electrode

The negative electrode may be an electrode which can be doped or dedoped with a lithium ion at potential lower than a positive electrode, and examples of the negative electrode include electrodes in which a negative electrode mixture containing a negative electrode material is supported on a negative electrode current collector, or electrodes composed solely of a negative electrode material. Examples of the negative electrode material include carbonaceous materials, chalcogen compounds (oxides, sulfides and the like), nitrides, metals or alloys, which can be doped or dedoped with a lithium ion at potential lower than a positive electrode. These negative electrode materials may be mixed and used.

The negative electrode materials will be exemplified below. Specific examples of the carbonaceous materials include graphites such as natural graphite and artificial graphite, cokes, carbon black, pyrolytic carbons, carbon fiber and organic polymer compound calcined bodies. Specific examples of the oxide include oxides of silicon represented by the formula $SiO_x$ (herein, x represents a positive real number) such as $SiO_2$ and $SiO$, oxides of titanium represented by the formula $TiO_x$ (herein, x represents a positive real number) such as $TiO_2$ and $TiO$, oxides of vanadium represented by the formula $VO_x$ (herein, x represents a positive real number) such as $V_2O_5$ and $VO_2$, oxides of iron represented by the formula $FeO_x$ (herein, x represents a positive real number) such as $Fe_3O_4$, $Fe_2O_3$ and $FeO$, oxides of tin represented by the formula $SnO_x$ (herein, x represents a positive real number) such as $SnO_2$ and $SnO$, oxides of tungsten represented by the formula $WO_x$ (herein, x represents a positive real number) such as $WO_3$ and $WO_2$, mixed metal oxides containing lithium and titanium and/or vanadium such as $Li_4Ti_5O_{12}$ and $LiVO_2$ (e.g., $Li_{1.1}V_{0.9}O_2$), and the like. Specific examples of the sulfide include sulfides of titanium represented by the formula $TiS_x$ (herein, x represents a positive real number) such as $Ti_2S_3$, $TiS_2$ and $TiS$, sulfides of vanadium represented by the formula $VS_x$ (herein, x represents a positive real number) such as $V_3S_4$, $VS_2$ and $VS$, sulfides of iron represented by the formula $FeS_x$ (herein, x represents a positive real number) such as $Fe_3S_4$, $FeS_2$ and $FeS$, sulfides of molybdenum represented by the formula $MoS_x$ (herein, x represents a positive real number) such as $Mo_2S_3$ and $MoS_2$, sulfides of tin represented by the formula $SnS_x$ (herein, x represents a positive real number) such as $SnS_2$ and $SnS$, sulfides of tungsten represented by the formula $WS_x$ (herein, x represents a positive real number) such as $WS_2$, sulfides of antimony represented by the formula $SbS_x$ (herein, x represents a positive real number) such as $Sb_2S_3$, sulfides of selenium represented by the formula $SeS_x$ (herein, x represents a positive real number) such as $Se_5S_3$, $SeS_2$, $SeS$, and the like. Specific examples of the nitride include lithium-containing nitrides such as $Li_3N$ and $Li_{3-x}A_xN$ (herein, A represents Ni and/or Co, and $0<x<3$). These carbonaceous materials, oxides, sulfides and nitrides may be used in combination, or may be either crystalline or amorphous. Further, these carbonaceous materials, oxides, sulfides and nitrides are principally supported on a negative electrode current collector, and used as an electrode.

Specific examples of the metal include lithium metals, silicon metals and tin metals. Further, specific examples of the alloy include lithium alloys such as Li—Al, Li—Ni and Li—Si; silicon alloys such as Si—Zn; tin alloys such as Sn—Mn, Sn—Co, Sn—Ni, Sn—Cu and Sn—La; and additionally, alloys such as $Cu_2Sb$ and $La_3Ni_2Sn_7$. These metals and alloys are principally used solely as an electrode (for example, used in the form of foil).

Among the negative electrode materials, carbonaceous materials predominantly made of graphite such as natural graphite and artificial graphite are preferably used from the viewpoint of high potential flatness, low average discharge potential, good cyclic performance and the like. As the shape of the carbonaceous material, for example, any of flake such as natural graphite, sphere such as mesocarbon microbeads, fiber such as graphitized carbon fiber, aggregate of fine powder and the like, may be used.

The negative electrode mixture may contain a binder, as required. The binder includes thermoplastic resins, and specific examples of the binder include PVdF, thermoplastic polyimide, carboxymethylcellulose, polyethylene, polypropylene and the like.

Examples of materials of the negative electrode current collector include Cu, Ni, stainless steel and the like, and from the viewpoint of difficulty of making an alloy with lithium and easiness of processing into a thin film, Cu may be advantageously used. Examples of the method for supporting a negative electrode mixture on the negative electrode current collector, include a method of pressure molding, a method of pasting a negative electrode mixture using a dispersion medium and the like, and applying this onto a negative electrode current collector and drying this. Pressing may be performed after drying. Herein, though the dispersion medium may be either water or an organic solvent, the water-dispersible polymeric binder is preferably used as the binder and the dispersion medium from the viewpoint of suppressing production cost in using an organic solvent binder. By using the water-dispersible polymeric binder for both of the positive electrode and the negative electrode, the production cost of a battery can be further suppressed and a battery having excellent environmental performance can be provided.

Separator

As the separator, for example, there can be used members having a form of porous membrane, non-woven fabric, woven fabric or the like made of a material such as a polyolefin resin, for example, polyethylene and polypropylene, a fluorine resin, or nitrogen-containing aromatic polymer. Moreover, two or more of the above-described materials may be used to form a separator, or the above-described materials may be laminated. Examples of the separator include separators described in, for example, JP2000-30686A and JP10-324758A. It is advantageous that the thickness of the separator is thinner as long as mechanical strength is maintained, from the viewpoint of increase in the volumetric energy density of a battery and decrease in internal resistance thereof, and it is usually about from 5 to 200 µm, preferably about from 5 to 40 µm.

The separator preferably has a porous film containing a thermoplastic resin. The nonaqueous electrolyte secondary battery preferably has a function by which, when an abnormal current flows in the battery usually because of short circuit between a positive electrode and a negative electrode and the like, the current is interrupted to block (shutdown) the flow of excessive current. Herein, shutdown is carried out by obstructing micropores of a porous film of a separator in the case of exceeding usual use temperature. Even if the temperature in the battery increases to a certain high temperature after shutdown, it is preferable that shutdown condition be maintained without being ruptured due to the temperature. Examples of this separator include a laminated film which has a heat resistant porous layer and a porous film laminated to each other, and it becomes possible to further increase the heat resistance of a secondary battery by using this film as a separator. Herein, the heat resistant porous layer may be laminated on both surfaces of the porous film.

The laminated film which has a heat resistant porous layer and a porous film laminated to each other will be described below.

In the laminated film, the heat resistant porous layer is a layer having higher heat resistance than the porous film, and the heat resistant porous layer may be formed from an inorganic powder, or may contain a heat resistant resin. Since the heat resistant porous layer contains a heat resistant resin, the heat resistant porous layer can be formed by an easy method such as coating. Examples of the heat resistant resin includes polyamide, polyimide, polyamideimide, polycarbonate, polyacetal, polysulfone, polyphenylene sulfide, polyether ketone, aromatic polyester, polyether sulfone and polyether imide, and from the viewpoint of further enhancing heat resistance, preferable are polyamide, polyimide, polyamideimide, polyether sulfone and polyether imide, more preferable are polyamide, polyimide and polyamideimide. Further more preferable are nitrogen-containing aromatic polymers such as aromatic polyamide (para-oriented aromatic polyamide, meta-oriented aromatic polyamide), aromatic polyimide and aromatic polyamideimide, particularly preferable is aromatic polyamide, and from the viewpoint of production, most preferable is para-oriented aromatic polyamide (hereinafter, referred to as "para-aramide" in some cases). Examples of the heat resistant resin also include poly-4-methylpentene-1 and cyclic olefin polymers. By using these heat resistant resins, the heat resistance of a laminated film, that is, the thermal membrane destruction temperature of a laminated film can be further enhanced. In the case of use of a nitrogen-containing aromatic polymer among these heat resistant resins, compatibility with an electrolytic solution, namely, a liquid retaining property on a heat resistant porous layer also increases, possibly due to polarity in its molecule, and also the rate of impregnation of an electrolytic solution in production of a nonaqueous electrolyte secondary battery is high, and also the charge and discharge capacity of a nonaqueous electrolyte secondary battery increases further.

The thermal membrane destruction temperature of the laminated film depends on the kind of the heat resistant resin, and is selected according to the use environment and intended use. More specifically, the thermal membrane destruction temperature can be controlled to be about 400° C. in the case of use of the above-described nitrogen-containing aromatic polymer, to be about 250° C. in the case of use of poly-4-methylpentene-1 and to be about 300° C. in the case of use of a cyclic olefin polymer, as the heat resistant resin, respectively. When the heat resistant porous layer is made of an inorganic powder, it is also possible to control the thermal membrane destruction temperature to be, for example, 500° C. or more.

The para-aramide is obtained by condensation polymerization of a para-oriented aromatic diamine and a para-oriented aromatic dicarboxylic halide, and consists substantially of a repeating unit in which an amide bond is linked at a para-position or according orientation position of an aromatic ring (for example, orientation position extending coaxially or parallel toward the reverse direction, such as 4,4'-biphenylene, 1,5-naphthalene, and 2,6-naphthalene). Specific examples of such the para-aramides include para-aramides having a para-orientation type structure or a structure according to the para-orientation type, such as poly (para-phenyleneterephthalamide), poly(para-benzamide), poly(4,4'-benzanilide terephthalamide), poly(para-phenylene-4,4'-biphenylene dicarboxylic amide), poly(para-phenylene-2,6-naphthalene dicarboxylic amide), poly(2-chloro-para-phenyleneterephthalamide) and para-phenyleneterephthalamide/2,6-dichloro para-phenyleneterephthalamide copolymer.

As the aromatic polyimide, preferable are wholly aromatic polyimides produced by polycondensation of an aromatic diacid anhydride and a diamine. Specific examples of the diacid anhydride include pyromellitic dianhydride, 3,3', 4,4'-diphenylsulfone tetracarboxylic dianhydride, 3,3',4,4'-benzophenone tetracarboxylic dianhydride, 2,2'-bis(3,4-dicarboxyphenyl)hexafluoropropane and 3,3',4,4'-biphenyl tetracarboxylic dianhydride. Specific examples of the diamine include oxydianiline, para-phenylenediamine, benzophenonediamine, 3,3'-methylenedianiline, 3,3'-diaminobenzophenone, 3,3'-diaminodiphenylsulfone and 1,5'-naphthalenediamine. Further, solvent-soluble polyimides can be suitably used. Examples of such a polyimide include a polyimide which is a polycondensate of 3,3',4,4'-diphenylsulfone tetracarboxylic dianhydride and an aromatic diamine.

Examples of the aromatic polyamideimide include those obtained by using an aromatic dicarboxylic acid and an aromatic diisocyanate and condensation-polymerizing them, and those obtained by using an aromatic diacid anhydride and an aromatic diisocyanate and condensation-polymerizing them. Specific examples of the aromatic dicarboxylic acid include isophthalic acid and terephthalic acid. Specific examples of the aromatic diacid anhydride include trimellitic anhydride. Specific examples of the aromatic diisocyanate include 4,4'-diphenylmethane diisocyanate, 2,4-tolylene diisocyanate, 2,6-tolylene diisocyanate, ortho-tolylane diisocyanate and m-xylene diisocyanate.

For further enhancing ion permeability, it is preferable that the heat resistant porous layer have the thickness as small as 1 µm or more and 10 µm or less, further 1 µm or more and 5 µm or less and particularly 1 µm or more and 4 µm or less. The heat resistant porous layer has micropores, and the pore size (diameter) is usually 3 µm or less, preferably 1 µm or less. When the heat resistant porous layer contains a heat resistant resin, the heat resistant porous layer may further contain fillers described later.

In the laminated film, it is preferable that the porous film have micropores, and have a shutdown function. In this case, the porous film contains a thermoplastic resin. A micropore size in the porous film is usually 3 µm or less, preferably 1 µm or less. The porous film has porosity of usually from 30 to 80% by volume, preferably from 40 to 70% by volume. In the nonaqueous electrolyte secondary battery, in the case of exceeding the usual use temperature, the porous film containing a thermoplastic resin is capable of obstructing micropores by softening of the thermoplastic resin constituting the film.

As the thermoplastic resin, those which are not dissolved in an electrolytic solution of a nonaqueous electrolyte secondary battery may be advantageously selected. Specific examples of the thermoplastic resin include polyolefin resins such as polyethylene and polypropylene, and thermoplastic polyurethane resins, and a mixture of two or more of these compounds may be used. For softening at lower temperature to cause shutdown, it is preferable to contain polyethylene. Specific examples of the polyethylene include polyethylenes such as low density polyethylene, high density polyethylene and linear polyethylene, and ultrahigh molecular weight polyethylenes having a molecular weight of 1000000 or more. For further enhancing the puncture strength of a porous film, it is preferable that the thermoplastic resin constituting the film contain at least an ultrahigh molecular weight polyethylene. From the viewpoint of production of a porous film, it is preferable in some cases that the thermoplastic resin contain a wax made of a polyolefin of low molecular weight (weight average molecular weight of 10000 or less).

The thickness of the porous film in the laminated film is usually 3 to 30 µm, further preferably 3 to 25 µm. The thickness of the laminated film is usually 40 µm or less, preferably 20 µm or less. It is preferred that the value of A/B be 0.1 or more and 1 or less when the thickness of the heat resistant porous layer is denoted by A (µm) and the thickness of the porous film is denoted by B (µm).

When the heat resistant porous layer contains a heat resistant resin, the heat resistant porous layer may contain one or more fillers. The material of the filler may be selected from among an organic powder, an inorganic powder or a mixture thereof. It is preferred that particles constituting the filler have an average particle size of 0.01 µm or more and 1 µm or less.

Examples of the organic powder include powders made of organic substances such as styrene, vinyl ketone, acrylonitrile, methyl methacrylate, ethyl methacrylate, glycidyl methacrylate, glycidyl acrylate and methyl acrylate, singly or in the form of a copolymer made of two or more of these compounds, and fluorine-containing resins such as polytetrafluoroethylene, ethylene tetrafluoride-propylene hexafluoride copolymer, ethylene tetrafluoride-ethylene copolymer and polyvinylidene fluoride; melamine resins; urea resins; polyolefins; polymethacrylate, and the like. These organic powders may be used singly, or as a mixture of two or more thereof. Among these organic powders, a polytetrafluoroethylene powder is preferable from the viewpoint of chemical stability.

Examples of the inorganic powder include powders made of inorganic substances such as metal oxides, metal nitrides, metal carbides, metal hydroxides, carbonates and sulfates, and among these, powders made of inorganic substances of low electric conductivity are preferably used. Specific examples of the powders include powders made of alumina, silica, titanium dioxide, calcium carbonate and the like. These inorganic powders may be used singly or as a mixture of two or more thereof. Among these inorganic powders, an alumina powder is preferable from the viewpoint of chemical stability. Here, it is more preferable that all particles constituting the filler be alumina particles, and further more preferable is an embodiment in which all particles constituting the filler are alumina particles and a part of or all of them are approximately spherical alumina particles. Incidentally, when the heat resistant porous layer is formed from an inorganic powder, the above-exemplified inorganic powders may be advantageously used, and a binder may be mixed with them as required.

The content of a filler in the case where the heat resistant porous layer contains a heat resistant resin depends on the specific gravity of the material of the filler, and for example, when all particles constituting the filler are alumina particles, the weight of the filler is usually 5 or more and 95 or less, preferably 20 or more and 95 or less, and more preferably 30 or more and 90 or less when the total weight of the heat resistant porous layer is taken as 100. These ranges can be appropriately set, depending on the specific gravity of the material of the filler.

Examples of the shape of the filler include an approximately spherical shape, a plate shape, a column shape, a needle shape, a whisker shape, a fiber shape and the like, and any particles can be used, and preferable particles are approximately spherical particles since uniform pores are formed easily with them. The approximately spherical particles include particles having a particle aspect ratio (particle major axis/particle minor axis) of 1 or more and 1.5 or less. The particle aspect ratio can be measured by an electron micrograph.

The separator has an air permeability according to the Gurley method of preferably from 50 to 300 sec/100 cc, further preferably from 50 to 200 sec/100 cc, from the viewpoint of combination with ion permeability. The separator has a porosity of usually from 30 to 80% by volume, preferably from 40 to 70% by volume. The separator may be a laminate of separators having different porosities.

Electrolytic Solution

In the secondary battery, the electrolytic solution is usually made of an organic solvent containing an electrolyte. Examples of the electrolyte include lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$ $LiC(SO_2CF_3)_3$, $Li_2B_{10}Cl_{10}$, LiBOB (herein, BOB means bis(oxalato)borate), lower aliphatic carboxylic acid lithium salts and $LiAlCl_4$, and a mixture of two or more of these compounds may be used. Usually, at least one compound selected from the group consisting of $LiPF_6$, $LiAsF_6$, $LiSbF_6$, $LiBF_4$, $LiCF_3SO_3$, $LiN(SO_2CF_3)_2$ and $LiC(SO_2CF_3)_3$ containing fluorine among the above-mentioned salts, is used as the lithium salt.

As the organic solvent, there can be used, for example, carbonates such as propylene carbonate, ethylene carbonate, dimethyl carbonate, diethyl carbonate, ethyl methyl carbonate, 4-trifluoromethyl-1,3-dioxolan-2-one and 1,2-di(methoxycarbonyloxy)ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran and 2-methyltetrahydrofuran; esters such as methyl formate, methyl acetate and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide and 1,3-propane sultone, or compounds obtained by further introducing a fluorine substituent into the organic solvents, and usually, two or more of these solvents are used in admixture. Among these, preferable are mixed solvents containing carbonates, and further preferable are mixed solvents of cyclic carbonates and non-cyclic carbonates or mixed solvents of cyclic carbonates and ethers. As the mixed solvents of cyclic carbonates and non-cyclic carbonates, preferable are mixed solvents containing ethylene carbonate, dimethyl carbonate and ethyl methyl carbonate since the operational temperature range is wide, a load property is excellent, and difficult degradability is secured even if a graphite material such as natural graphite and artificial graphite is used as the negative electrode active material. Lithium salts containing fluorine such as $LiPF_6$ and an electrolytic solution containing organic solvents having a fluorine substituent are preferably used since a particularly excellent safety improving effect is obtained. Mixed solvents containing dimethyl carbonate and ethers having a fluorine substituent such as pentafluoropropyl methyl ether and 2,2,3,3-tetrafluoropropyl difluoromethyl ether are further preferable since these are excellent also in a large current discharge property.

Instead of the electrolytic solution, a solid electrolyte may be used. As the solid electrolyte, for example, organic polymer electrolytes such as polyethylene oxide type polymer compounds and polymer compounds containing at least one of a polyorganosiloxane chain or polyoxyalkylene chain can be used. Further, so-called gel type electrolytes obtained by supporting a non-aqueous electrolyte solution on a polymer compound can also be used. Moreover, inorganic solid electrolytes containing a sulfide such as $Li_2S$—$SiS_2$, $Li_2S$—$GeS_2$, $Li_2S$—$P_2S_5$, $Li_2S$—$B_2S_3$, $Li_2$—$SiS_2$—$Li_3PO_4$ and $Li_2S$—$SiS_2$—$Li_2SO_4$ may also be used. Using these solid electrolytes, safety can be further enhanced in some cases. In the nonaqueous electrolyte secondary battery, when a solid electrolyte is used, the solid electrolyte plays a role of separator in some cases, and in these cases, a separator is not necessary in some cases.

EXAMPLES

The present invention will be described in more detail by way of examples. Various evaluations of the lithium mixed metal oxide were performed according to the following methods.

1. Powder X-ray Diffractometry of Lithium Mixed Metal Oxide

Powder X-ray diffractometry of a lithium mixed metal oxide was carried out using RINT 2500 TTR-type manufactured by Rigaku Corporation. A lithium mixed metal oxide was filled on a dedicated substrate, and the measurement was carried out in the range of diffraction angle $2\zeta=10°$ to $90°$ using a CuKα radiation source, to obtain a powder X-ray diffraction pattern.

2. Measurement of BET Specific Surface Area of Lithium Mixed Metal Oxide

One gram of a powder was dried at 150° C. for 15 minutes in a nitrogen atmosphere, and then the BET specific surface area was measured using FlowSorb II 2300 manufactured by Micrometrics.

3. Analysis of Composition of Lithium Mixed Metal Oxide

A powder was dissolved in hydrochloric acid, and then measurement thereof was performed using an inductively coupled plasma-atomic emission spectrometry (SPS 3000, hereinafter, referred to as ICP-AES in some cases).

4. SEM Observation of Lithium Mixed Metal Oxide

Particles constituting a lithium mixed metal oxide were placed on an electrically conductive sheet pasted onto a sample stage, and applied with an electron beam having an acceleration voltage of 20 kV using JSM-5510 manufactured by JEOL Ltd., and SEM observation was carried out. The average primary particle size was determined by selecting fifty particles arbitrarily from an image (SEM photograph) obtained by SEM observation, measuring the particle sizes of them, and calculating an average value thereof.

Production Example 1 (Production of Lithium Mixed Metal Oxide 1)

In a polypropylene beaker, 83.88 g of potassium hydroxide was added to 200 ml of distilled water and dissolved by stirring to dissolve potassium hydroxide completely to prepare a potassium hydroxide aqueous solution (alkali aqueous solution). In a glass beaker, to 200 ml of distilled water were added 15.68 g of nickel(II) chloride hexahydrate, 13.66 g of manganese(II) chloride tetrahydrate and 2.982 g of iron(III) chloride tetrahydrate, and these were dissolved by stirring to obtain a nickel-manganese-iron mixed aqueous solution. The above-described nickel-manganese-iron mixed aqueous solution was added dropwise to the above-described potassium hydroxide aqueous solution while stirring the potassium hydroxide aqueous solution to cause generation of a coprecipitate to obtain a coprecipitate slurry. Subsequently, the coprecipitate slurry was subjected to filtration and washing with distilled water, and dried at 100° C. to obtain a coprecipitate $P_1$. The coprecipitate $P_1$ had the average primary particle size of 0.05 µm and the BET specific surface area of 63 m$^2$/g. As a result of analysis of the $P_1$ composition, the molar ratio of Ni:Mn:Fe was 0.44:0.46:0.10.

The coprecipitate ($P_1$) (2.0 g) and lithium hydroxide monohydrate (1.16 g) were dry-mixed using an agate mortar to obtain a mixture. Then, the mixture was placed in an alumina calcination vessel, maintained at 800° C. for 6 hours in an air atmosphere to be calcined using an electric furnace, and the mixture was cooled to room temperature to obtain a calcined article. The calcined article was pulverized, washed with distilled water by decantation, and filtrated and dried at 100° C. for 8 hours to obtain a lithium mixed metal oxide 1.

As a result of composition analysis of the lithium mixed metal oxide 1, the molar ratio of Li:Ni:Mn:Fe was 1.21:0.44:0.46:0.10. The lithium mixed metal oxide 1 had a BET specific surface area of 8.0 m$^2$/g and an average primary particle size of 0.2 µm. As a result of powder X-ray diffractometry, it was found that the crystal structure of the lithium mixed metal oxide 1 was a crystal structure belonging to the R-3m space group.

Production Example 2 (Production of Lithium Mixed Metal Oxide 2)

Lithium carbonate (Li$_2$CO$_3$: manufactured by Honjo Chemical Corp.) (39.16 g), nickel hydroxide (Ni(OH)$_2$: manufactured by Kansai Catalyst Co. Ltd.) (31.72 g), manganese oxide (MnO$_2$: manufactured by Kojundo Chemical Laboratory Co. Ltd.) (38.08 g), tri-cobalt tetra-oxide (Co$_3$O$_4$: manufactured by Seido Chemical Industry Co., Ltd.)(15.60 g) and boric acid (H$_3$BO$_3$: manufactured by YCHEM Co., Ltd.) (1.85 g) were weighed out respectively, and mixed using a ball mill mixer under conditions shown below to obtain a raw material mixed powder.
Pulverization media: 15 mmφ alumina balls (5.8 kg)
Revolution of ball mill: 80 rpm
Volume of ball mill: 5 L The raw material mixed powder was charged in an alumina sheath, and calcined by being kept at 1040° C. for 4 hours in an air atmosphere to obtain a block object. This block object was pulverized using a jet mill apparatus (AFG-100, manufactured by Hosokawa Micron Corp.) to obtain a lithium mixed metal oxide 2.

As a result of composition analysis by the ICP of the lithium mixed metal oxide 2, the molar ratio of Li:Ni:Mn:Co was 1.04:0.34:0.42:0.2. The lithium mixed metal oxide 2 had a BET specific surface area of 2.68 m$^2$/g and an average primary particle size of 1.25 µm. As a result of powder X-ray diffractometry, it was found that the crystal structure of the lithium mixed metal oxide 2 was a crystal structure belonging to the R-3m space group.

Production Example 3 (Production of Lithium Mixed Metal Oxide 3)

A lithium mixed metal oxide 3 was obtained by following the same procedure as in Production Example 1 excepting that using nickel(II)chloride hexahydrate and manganese(II) chloride hexahydrate instead of iron(II)chloride tetrahydrate, they were weighed out so that the molar ratio of Ni:Mn be 0.5:0.5. As a result of composition analysis of the lithium mixed metal oxide 3, the molar ratio of Li:Ni:Mn was 1.10:0.5:0.5. The lithium mixed metal oxide 3 had a BET specific surface area of 6 m$^2$/g and an average primary particle size of 0.2 µm. As a result of powder X-ray diffractometry, it was found that the crystal structure of the lithium mixed metal oxide 3 was a crystal structure belonging to the R-3m space group.

Production Example 4 (Production of Aqueous Emulsion 1)

In a pressure-resistant container was introduced a solution prepared by previously dissolving 190 parts by weight of vinyl acetate, 2 parts by weight of polyvinyl alcohol "POVAL 217" (manufactured by KURARAY Co., Ltd., saponification degree 88 mol %, average polymerization degree 1700), 7 parts by weight of "POVAL 205" (manufactured by KURARAY Co., Ltd., saponification degree 88 mol %, average polymerization degree 500) and 0.005 parts by weight of ferrous sulfate heptahydrate in 170 parts by weight of water. Then, the inside of an autoclave was replaced with a nitrogen gas, and the inside of the container was raised to 60° C. and then pressurized to 4.6 MPa by introduction of an ethylene gas. Next, 0.2 parts by weight of an aqueous solution of hydrogen peroxide and 0.6 parts by weight of sodium tartrate are respectively diluted with water and added dropwise. A temperature in a reaction vessel was maintained at 60° C. during polymerization by controlling a temperature of a jacket, and further an aqueous solution of hydrogen peroxide was added and stirred until a concentration of vinyl acetate in a reaction solution becomes 1% by weight or less. Thereafter, an unreacted ethylene gas is removed, and then a product is taken out to obtain an aqueous emulsion 1 containing ethylene-vinyl acetate copolymer in which the content of a copolymer component is 55% by weight and viscosity is 1150 mPa·s.

Production Example 5 (Production of Aqueous Emulsion 2)

To a pressure-resistant container was added a solution prepared by dissolving 33 parts by weight of vinyl acetate, 0.5 parts by weight of hydroxyethylcellulose, 1 part by weight of "LATEMUL 1135S-70" predominantly made of polyoxyethylene undecyl ether (the content of polyethylene alkyl ether in which an alkyl group has 11 or less carbon atoms is 90% by weight or more, average number of added polyoxyethylene groups n=35, manufactured by Kao Corp.), 1 part by weight of "LATEMUL 1108" predominantly made of polyoxyethylene undecyl ether (the content of polyethylene alkyl ether in which an alkyl group has 11 or less carbon atoms is 90% by weight or more, average number of added polyoxyethylene groups n=8, manufactured by Kao Corp.), 1 part by weight of sodium lauryl sulfate, 0.002 parts by weight of ferrous sulfate heptahydrate, 0.08 parts by weight of sodium sulfate and 0.06 parts by weight of acetic acid in 85 parts by weight of water. Next, the inside of the pressure-resistant container was replaced with a nitrogen gas, and the inside of the container was raised to 50° C. and then pressurized to 6.5 MPa by introduction of an ethylene gas, and 2.3 parts by weight/hour of a 6% aqueous solution of sodium persulfate and 1.3 parts by weight/hour of a 2.5% by weight aqueous solution of Rongalite were added to a pressure-resistant container to initiate polymerization. Subsequently, after confirmation of increase in liquid temperature in the pressure-resistant container, 67 parts by weight of vinyl acetate, 9 parts by weight of 2-ethylhexyl acrylate and 20 parts by weight of a 20% by weight aqueous solution of N-methyrolacrylamide were added over 5 hours. Ethylene was added for 4 hours so that a pressure be constant at 6.5 MPa while maintaining a liquid temperature in the container at 50° C., and the pressure-resistant container was cooled at the time when the content of remaining vinyl acetate monomer is less than 1% by weight, and an unreacted ethylene gas is removed, and then a product is taken out to obtain an aqueous emulsion 2 of ethylene-vinyl acetate-2-ethylhexyl acrylate copolymer in which the content of a copolymer component is 60% by weight and viscosity is 100 mPa·s.

Production Example 6 (Production of Aqueous Emulsion 3)

In 25 parts by weight of water, 0.7 parts by weight of sodium dodecylbenzene sulphonate, 0.005 parts by weight of ferrous sulfate and 0.8 parts by weight of sodium hydrogen carbonate were dissolved, and the resulting solution was sent to a polymerization tank, the inside of which was previously replaced with ethylene, and next, 2 parts by weight of vinyl chloride was charged and the resulting mixture was stirred and emulsified. Thereafter, the polymerization tank was pressurized to 4.9 MPa by an ethylene gas and heated to 50° C. Polymerization was performed over 8 hours while adding 18 parts by weight of vinyl chloride, 1.5 parts by weight of a Rongalite aqueous solution and 8.0 parts by weight of an aqueous solution of ammonium persulfate continuously keeping an internal temperature at 50° C. After the polymerization, excessive ethylene was discharged until a tank pressure decreased to an atmospheric pressure to obtain an aqueous emulsion 3 containing a vinyl chloride-ethylene copolymer including a copolymer component of 50% by weight.

Example 1

The lithium mixed metal oxide 1 obtained in Production Example 1 was used as a lithium mixed metal oxide, the lithium mixed metal oxide 1 and an electrically conductive material (material prepared by mixing acetylene black and graphite in a ratio of 9:1) were weighed out so as to be 87:10 (by weight), and mixed in an agate mortar to obtain a mixed powder. The aqueous emulsion 1 (content of copolymer component is 55% by weight) obtained in Production Example 4 was used as a water-dispersible polymeric binder, and the mixed powder and the water-dispersible polymeric binder were mixed and kneaded so that the ratio of mixed powder:solid content (a copolymer component of the emulsion) of water-dispersible polymeric binder be 97:3 (by weight) to obtain an electrode mixture. The electrode mixture was applied onto an Al foil having the thickness of 40 μm as a current collector, and dried at 60° C. for 2 hours, and then vacuum-dried at 80° C. for 10 hours to obtain an electrode sheet. Subsequently, the electrode sheet was rolled by a pressure of 0.5 MPa using a roll press, and the rolled sheet was stamped into a size of 14.5 mmφ by a stamping machine and vacuum-dried at 150° C. for 8 hours to obtain an electrode 1.

Example 2

Using the aqueous emulsion 2 (content of copolymer component is 60% by weight) obtained in Production Example 5 and carboxymethylcellulose (CMC, manufactured by Aldrich Chemical Co.) as a thickener, they were mixed so that copolymer component of emulsion:thickener be 9:1 (by weight) to prepare a water-dispersible polymeric binder. Subsequently, the water-dispersible polymeric binder and the mixed powder (mixed powder similar to that in Example 1) were used, and mixed and kneaded so that the ratio of mixed powder:solid content (a copolymer component of the emulsion and CMC) of water-dispersible polymeric binder be 97:3 (by weight) to obtain an electrode mixture. Then, an electrode 2 was obtained in the same manner as in Example 1.

Example 3

Using the aqueous emulsion 2 (content of copolymer component is 60% by weight) obtained in Production Example 5 and carboxymethylcellulose (CMC, manufactured by Aldrich Chemical Co.) as a thickener, they were mixed so that copolymer component of emulsion: thickener be 1:9 (by weight) to prepare a water-dispersible polymeric binder. Subsequently, the water-dispersible polymeric binder and the mixed powder (mixed powder similar to that in Example 1) were used, and mixed and kneaded so that the ratio of mixed powder:solid content (a copolymer component of the emulsion and CMC) of water-dispersible polymeric binder be 99:1 (by weight) to obtain an electrode mixture. Then, an electrode 3 was obtained in the same manner as in Example 1.

Example 4

The lithium mixed metal oxide 2 obtained in Production Example 2 was used as a lithium mixed metal oxide, the lithium mixed metal oxide 2 and an electrically conductive material (material prepared by mixing acetylene black and graphite in a ratio of 9:1) were weighed out so as to be 87:10 (by weight), and mixed in an agate mortar to obtain a mixed powder. Further, using the aqueous emulsion 2 (content of copolymer component is 60% by weight) obtained in Production Example 5 and carboxymethylcellulose (CMC, manufactured by Aldrich Chemical Co.) as a thickener, they were mixed so that copolymer component of emulsion: thickener be 9:1 (by weight) to prepare a water-dispersible polymeric binder. Subsequently, the water-dispersible polymeric binder and the mixed powder were used, and mixed and kneaded so that the ratio of mixed powder:solid content (a copolymer component of the emulsion and CMC) of water-dispersible polymeric binder be 97:3 (by weight) to obtain an electrode mixture. Then, an electrode 4 was obtained in the same manner as in Example 1. Hereinafter, by following the same procedure as in Example 1, an electrode 4 was obtained.

Example 5

Using the aqueous emulsion 3 (content of copolymer component is 50% by weight) obtained in Production Example 6 and carboxymethylcellulose (CMC, manufactured by Aldrich Chemical Co.) as a thickener, they were mixed so that copolymer component of emulsion: thickener be 1:9 (by weight) to prepare a water-dispersible polymeric binder. Subsequently, the water-dispersible polymeric binder and the mixed powder (mixed powder similar to that in Example 1) were used, and mixed and kneaded so that the ratio of mixed powder:solid content (a copolymer component of the emulsion and CMC) of water-dispersible polymeric binder be 99:1 (by weight) to obtain an electrode mixture. Then, an electrode 5 was obtained in the same manner as in Example 1.

Example 6

The lithium mixed metal oxide 3 obtained in Production Example 3 was used as a lithium mixed metal oxide, the lithium mixed metal oxide 3 and an electrically conductive material (material prepared by mixing acetylene black and graphite in a ratio of 9:1) were weighed out so as to be 87:10 (by weight), and mixed in an agate mortar to obtain a mixed powder. Using the aqueous emulsion 3 (content of copolymer component is 50% by weight) obtained in Production Example 6 and carboxymethylcellulose (CMC, manufactured by Aldrich Chemical Co.) as a thickener, they were mixed so that copolymer component of emulsion: thickener be 1:9 (by weight) to prepare a water-dispersible polymeric binder. Subsequently, the water-dispersible polymeric binder and the mixed powder (mixed powder similar to that in Example 1) were used, and mixed and kneaded so that the ratio of mixed powder:solid content (a copolymer component of the emulsion and CMC) of water-dispersible polymeric binder be 99:1 (by weight) to obtain an electrode mixture. Hereinafter, by following the same procedure as in Example 1, an electrode 6 was obtained.

Comparative Example 1

An organic solvent binder containing polyvinylidene fluoride (PVdF) in an amount of 5.17% by weight was prepared by dissolving the PVdF in N-methyl-2-pyrrolidone (NMP). Using the organic solvent binder and a mixed powder (mixed powder similar to that in Example 1), they were mixed and kneaded so that a ratio of mixed powder: PVdF be 97:3 (by weight) to obtain an electrode mixture. The electrode mixture was applied onto an Al foil having the thickness of 40 μm as a current collector, and dried at 60° C. for 2 hours to obtain an electrode sheet. Subsequently, the electrode sheet was rolled by a pressure of 0.5 MPa using a roll press, and the rolled sheet was stamped into a size of 14.5 mmϕ by a stamping machine and vacuum-dried at 150° C. for 8 hours to obtain an electrode 7.

Comparative Example 2

An electrode 8 was obtained in the same manner as in Comparative Example 1 except for using the same mixed powder as in Example 4.

Comparative Example 3

An electrode 9 was obtained in the same manner as in Comparative Example 1 except for using the same mixed powder as in Example 6.

<Preparation of Nonaqueous Electrolyte Secondary Battery>

Each of the electrodes 1 to 9 obtained in Examples 1 to 6 and Comparative Examples 1 to 3 was used as a positive electrode, metal Li was used as a negative electrode, a solution (hereinafter, described as $LiPF_6$/(EC+DMC+EMC) in some cases), which was prepared by dissolving $LiPF_6$ in a concentration of 1 mol/l liter into a mixed solution made of ethylene carbonate (hereinafter, referred to as EC in some cases), dimethyl carbonate (hereinafter, referred to as DMC in some cases) and ethyl methyl carbonate (hereinafter, referred to as EMC in some cases) in proportions of 30:35: 35 (ratio by volume), was used as an electrolytic solution, and a polypropylene porous membrane was used as a separator, and these were combined into one to fabricate nonaqueous electrolyte secondary batteries 1 to 9 (coin-shaped battery (R2032)).

Using the nonaqueous electrolyte secondary batteries 1 to 9, a battery capacity was measured under conditions shown below while maintaining at 25° C. The results of measurements are shown in tables 1-1 to 1-3.

<Condition of battery capacity measurement>

The charge maximum voltage was adjusted to 4.3 V, the charge time was adjusted to 8 hours, the charge current was adjusted to 0.2 mA/cm², and in discharging, the discharge minimum voltage was adjusted to a constant level of 3.0 V and the discharge current was maintained at a constant level of 0.2 mA/cm².

TABLE 1-1

|  | lithium mixed metal oxide | Binder | Secondary battery | Initial discharge capacity (mAh/g) |
|---|---|---|---|---|
| Example 1 | 1 | aqueous emulsion 1 | nonaqueous electrolyte secondary battery 1 | 116 |
| Example 2 | 1 | aqueous emulsion 2 | nonaqueous electrolyte secondary battery 2 | 116 |
| Example 3 | 1 | aqueous emulsion 2 | nonaqueous electrolyte secondary battery 3 | 117 |
| Example 5 | 1 | aqueous emulsion 3 | nonaqueous electrolyte secondary battery 5 | 116 |
| Comparative Example 1 | 1 | PVdF | nonaqueous electrolyte secondary battery 7 | 115 |

TABLE 1-2

|  | lithium mixed metal oxide | Binder | Secondary battery | Initial discharge capacity (mAh/g) |
|---|---|---|---|---|
| Example 4 | 2 | aqueous emulsion 2 | nonaqueous electrolyte secondary battery 4 | 154 |
| Comparative Example 2 | 2 | PVdF | nonaqueous electrolyte secondary battery 8 | 153 |

TABLE 1-3

|  | lithium mixed metal oxide | Binder | Secondary battery | Initial discharge capacity (mAh/g) |
|---|---|---|---|---|
| Example 6 | 3 | aqueous emulsion 3 | nonaqueous electrolyte secondary battery 6 | 157 |

TABLE 1-3-continued

|  | lithium mixed metal oxide | Binder | Secondary battery | Initial discharge capacity (mAh/g) |
|---|---|---|---|---|
| Comparative Example 3 | 3 | PVdF | nonaqueous electrolyte secondary battery 9 | 157 |

It was found from tables 1-1 to 1-3 that the nonaqueous electrolyte secondary batteries in examples had performance equal (within ±1%) to that of the secondary battery in comparative example using an organic solvent binder (PVdF).

On the nonaqueous electrolyte secondary batteries, a discharge rate test is carried out under conditions shown below while maintaining at 25° C., and a large current discharge property is evaluated, and thereby it is found that the nonaqueous electrolyte secondary batteries in examples have performance equal to that of the secondary battery in comparative example using an organic solvent binder.

<Discharge Rate Test>

The charge maximum voltage was adjusted to 4.3 V, the charge time was adjusted to 8 hours, the charge current was adjusted to 0.2 mA/cm$^2$, and in discharging, the discharge minimum voltage was adjusted to a constant level of 3.0 V and the discharge current was maintained at a constant level of 0.2 mA/cm$^2$, and under such conditions, discharge was carried out while changing the discharge current in each cycle as described below. Higher discharge capacity by discharge at 10 C (high current rate) means higher power output.

Discharge at 1st and 2nd cycles (0.2 C): discharge current 0.2 mA/cm$^2$

Discharge at 3rd cycle (10 C): discharge current 10 mA/cm$^2$

<Discharge Capacity Maintenance Ratio>

Discharge capacity maintenance ratio (%)=(discharge capacity at 10 C)/(0.2 C initial discharge capacity (discharge capacity at 1st cycle))×100

Production Example 7 (Production of Laminated Film)

(1) Production of Coating Solution

Calcium chloride (272.7 g) was dissolved in NMP (4200 g), and then para-phenylenediamine (132.9 g) was added and dissolved completely. To the resulting solution was added gradually 243.3 g of terephthalic dichloride, and polymerization thereof was carried out to obtain a para-aramide, and this was diluted further with NMP to obtain a para-aramide solution (A) having a concentration of 2.0% by weight. To 100 g of the resulting para-aramide solution were added 2 g of an alumina powder (a) (manufactured by Nippon Aerosil Co., Ltd., Alumina C, average particle size 0.02 μm) and 2 g of an alumina powder (b) (Sumicorandom AA03 manufactured by Sumitomo Chemical Co., Ltd., AA03, average particle size. 0.3 μm) as a filler in a total amount of 4 g, and these were mixed and treated three times by a nanomizer, and further, filtrated through a 1000 mesh wire netting, and defoamed under a reduced pressure to produce a slurry-form coating solution (B). The weight of the alumina powders (filler) with respect to the total weight of the para-aramide and the alumina powders was 67% by weight.

(2) Production and Evaluation of Laminated Film

A polyethylene porous membrane (thickness 12 μm, air permeability 140 sec/100 cc, average pore size 0.1 μm, porosity 50%) was used as the porous film. On a PET film having the thickness of 100 μm, the polyethylene porous membrane was fixed, and the slurry-form coating solution (B) was applied onto the porous membrane by a bar coater manufactured by Tester Sangyo Co., Ltd. The product was immersed in water as a poor solvent while maintaining integration of the porous membrane applied on the PET film to cause deposition of a para-aramide porous membrane (heat resistant porous layer), and then the solvent was dried to obtain a laminated film 1 which has a heat resistant porous layer and a porous film laminated to each other. The thickness of the laminated film 1 was 16 μm, and the thickness of the para-aramide porous membrane (heat resistant porous layer) was 4 μm. The laminated film 1 had an air permeability of 180 sec/100 cc, and a porosity of 50%. The cross section of the heat resistant porous layer in the laminated film 1 was observed by a scanning electron microscope (SEM) to find that relatively small micropores of about 0.03 μm to 0.06 μm and relatively large micropores of about 0.1 μm to 1 μm were present. Evaluation of the laminated film was carried out by the following method.

<Evaluation of Laminated Film>

(A) Measurement of Thickness

The thickness of the laminated film and the thickness of the porous film were measured according to JIS standard (K7130-1992). As the thickness of the heat resistant porous layer, a value obtained by subtracting the thickness of the porous film from the thickness of the laminated film was used.

(B) Measurement of Air Permeability by Gurley Method

The air permeability of the laminated film was measured by digital timer mode Gurley type Densometer manufactured by Yasuda Seiki Seisakusho Ltd., according to JIS P 8117.

(C) Porosity

A sample of the resulting laminated film was cut into a square having a side length of 10 cm, and the weight W (g) and the thickness D (cm) thereof were measured. The weights (Wi (g)) of the layers in the sample were measured, and the volumes of the respective layers were calculated from Wi and the true specific gravities (true specific gravity i (g/cm$^3$)) of the materials of the respective layers, and the porosity (% by volume) was calculated according to the following formula.

Porosity (% by volume)=100×[1−{$W1$/(true specific gravity 1)+$W2$/(true specific gravity 2)+ . . . +$Wn$/(true specific gravity $n$)}/(10×10× $D$)]

In the secondary batteries in the above-described examples, a nonaqueous electrolyte secondary battery which can further prevent thermal membrane destruction can be obtained if the laminated film similar to that obtained in Production Example 7 is used as the separator.

INDUSTRIAL APPLICABILITY

In accordance with the present invention, it is possible to provide an electrode mixture and an electrode, which lead to a nonaqueous electrolyte secondary battery having a sufficient battery capacity, particularly a sufficient initial discharge capacity. The secondary battery does not impair a large current discharge property. The secondary battery can be preferably applied in a $LiNiO_2$ positive electrode active material having a small particle size in which reactivity with water is considered high. Further, since an electrode mixture is obtained by use of a water based binder, the production cost in using an organic solvent binder can be suppressed, and the electrode and the nonaqueous electrolyte secondary battery can be obtained undergoing a production step having excellent environmental performance.

The invention claimed is:

1. An electrode mixture comprising a lithium mixed metal oxide represented by formula (1):

$$Li_z(Ni_{1-x-y}Mn_xM_y)O_2 \quad (1)$$

wherein x is 0.30 or more and less than 1,
y is 0.01 or more and less than 0.3,
x+y is 0.31 or more and less than 1,
z is 0.5 or more and 1.5 or less, and
M represents Co and/or Fe,
an electrically conductive material, and a water-dispersible polymeric binder which contains an aqueous emulsion,
wherein the aqueous emulsion contains one or more aqueous emulsions selected from the group consisting of vinyl polymer emulsions and acrylic polymer emulsions, and
wherein a vinyl polymer in the vinyl polymer emulsions is at least one selected from the group consisting of ethylene-vinyl acetate copolymer, ethylene-vinyl acetate-vinyl chloride copolymer, ethylene-vinyl chloride copolymer, and vinyl chloride-vinyl acetate copolymer, and
an acrylic polymer in the acrylic emulsion is at least one selected from the group consisting of alkyl acrylate monopolymers, vinyl acetate-alkyl acrylate copolymer, vinyl chloride-alkyl acrylate copolymer, ethylene-vinyl acetate-alkyl acrylate copolymer, and methyl acrylate-ethyl acrylate copolymer,
wherein an average particle size of the lithium mixed metal oxide is 0.1 to 0.3 μm and an average particle size of one or both of the vinyl polymer and the acrylic polymer in the aqueous emulsion is 0.001 to 0.9 μm, and
wherein a BET specific surface area of the lithium mixed metal oxide is from 8.0 to 20 m²/g.

2. The electrode mixture according to claim 1, wherein the water-dispersible polymeric binder is an aqueous polytetrafluoroethylene dispersion.

3. The electrode mixture according to claim 1, wherein the water-dispersible polymeric binder further contains a thickener.

4. The electrode mixture according to claim 3, wherein the thickener contains one or more members selected from the group consisting of methylcellulose, carboxymethylcellulose, polyethylene glycol, sodium polyacrylate, polyvinyl alcohol and polyvinylpyrrolidone.

5. The electrode mixture according to claim 1, wherein the electrically conductive material contains a carbonaceous material.

6. An electrode mixture comprising a lithium mixed metal oxide represented by formula (1):

$$Li_z(Ni_{1-x-y}Mn_xM_y)O_2 \quad (1)$$

wherein x is 0.30 or more and less than 1,
y is 0.01 or more and less than 0.3,
x+y is 0.31 or more and less than 1,
z is 0.5 or more and 1.5 or less, and
M represents Co and/or Fe,
an electrically conductive material, and a water-dispersible polymeric binder which contains an aqueous emulsion,
wherein the aqueous emulsion contains one or more aqueous emulsions selected from the group consisting of vinyl polymer emulsions and acrylic polymer emulsions, and
wherein a vinyl polymer in the vinyl polymer emulsions is at least one selected from the group consisting of ethylene-vinyl acetate copolymer, ethylene-vinyl acetate-vinyl chloride copolymer, ethylene-vinyl chloride copolymer, and vinyl chloride-vinyl acetate copolymer, and
an acrylic polymer in the acrylic emulsion is at least one selected from the group consisting of alkyl acrylate monopolymers, vinyl acetate-alkyl acrylate copolymer, vinyl chloride-alkyl acrylate copolymer, ethylene-vinyl acetate-alkyl acrylate copolymer, and methyl acrylate-ethylacrylate copolymer,
wherein the lithium mixed metal oxide is 0.1 to 0.3 μm of the average particle size,
wherein the concentration of the lithium mixed metal oxide, the electrically conductive material and the polymeric binder in the electrode mixture is 30 to 90% by weight, and
wherein a BET specific surface area of the lithium mixed metal oxide is from 8.0 to 20 m²/g.

* * * * *